United States Patent
Zuber et al.

(12) United States Patent
(10) Patent No.: US 11,066,102 B2
(45) Date of Patent: Jul. 20, 2021

(54) AUXILIARY FRAME HAVING AN ATTACHMENT ADAPTER

(71) Applicant: Benteler Automobiltechnik GmbH, Paderborn (DE)

(72) Inventors: Armin Zuber, Paderborn (DE); Oliver Mielke, Altenbeken (DE); Thomas Prus-Thorns, Paderborn (DE)

(73) Assignee: Benteler Automobiltechnik GmbH, Paderborn (DE)

(*) Notice: Subject to any disclaimer, the term of this patent is extended or adjusted under 35 U.S.C. 154(b) by 91 days.

(21) Appl. No.: 16/295,501

(22) Filed: Mar. 7, 2019

(65) Prior Publication Data
US 2019/0276079 A1  Sep. 12, 2019

(30) Foreign Application Priority Data
Mar. 12, 2018  (DE) .................... 10 2018 105 637.0

(51) Int. Cl.
| | |
|---|---|
| *B62D 21/02* | (2006.01) |
| *B62D 21/09* | (2006.01) |
| *B62D 21/11* | (2006.01) |
| *B62D 65/02* | (2006.01) |
| *B62D 29/00* | (2006.01) |
| *B62D 21/06* | (2006.01) |

(52) U.S. Cl.
CPC ............ *B62D 21/02* (2013.01); *B62D 21/09* (2013.01); *B62D 21/11* (2013.01); *B62D 29/008* (2013.01); *B62D 65/024* (2013.01); *B62D 21/06* (2013.01)

(58) Field of Classification Search
CPC ...... B62D 21/02; B62D 21/09; B62D 21/155; B62D 21/11
See application file for complete search history.

(56) References Cited

U.S. PATENT DOCUMENTS

| | | | |
|---|---|---|---|
| 9,505,437 B2* | 11/2016 | Leibl ................ | B62D 21/07 |
| 10,689,034 B2* | 6/2020 | Schmalzrieth ....... | B62D 27/065 |
| 2013/0300157 A1* | 11/2013 | Leibl ................ | B62D 25/08 296/204 |
| 2017/0106913 A1 | 4/2017 | Schmalzrieth et al. | |

FOREIGN PATENT DOCUMENTS

| | | |
|---|---|---|
| CN | 201193050 Y | 2/2009 |
| CN | 106585722 A | 4/2017 |
| DE | 10 2016 206 646 A1 | 1/2016 |

* cited by examiner

*Primary Examiner* — Faye M Fleming
(74) *Attorney, Agent, or Firm* — Holland & Hart LLP

(57) ABSTRACT

The disclosure relates to art auxiliary frame for a vehicle, including: a longitudinal member with a first longitudinal member end that may include a first adapter socket configured to accommodate different attachment adapters configured to fix the longitudinal member on different vehicle frames that may include different frame geometries; and a first attachment adapter in the first adapter socket, wherein the first attachment adapter is configured to fix the longitudinal member on a first particular vehicle frame.

22 Claims, 4 Drawing Sheets

AUXILIARY FRAME HAVING AN ATTACHMENT ADAPTER

CROSS-REFERENCE TO RELATED APPLICATIONS

This application claims priority to German patent application No. 10 2018 105 637.0, entitled "Achsträger mit einem Anbindungsadapter", and filed on Mar. 12, 2018 by the Applicant of this application. The entire disclosure of the German application is incorporated herein by reference for all purposes.

BACKGROUND

The present disclosure relates to an auxiliary frame having an attachment adapter, in particular an attachment adapter for a vehicle having an attachment adapter.

Auxiliary frames or subframes are installed in vehicles to ensure a stable connection between a vehicle frame and running gear components, e.g. a running gear member. In this case, the auxiliary frame can be connected to the vehicle frame by isolated mounting, e.g. by flexible mounts, in order to ensure effective vibration isolation, thereby making it possible to reduce noise which arises. In this case, the auxiliary frame can also be connected to the vehicle frame by non-isolated mounting, e.g. by screwed joints, in order to ensure fastening of the vehicle frame to the auxiliary frame.

In conventional vehicles, the geometry of the auxiliary frame and the position and shape of the mount sockets must often be changed for different vehicle types owing to different frame geometries of the vehicle frames. Thus, in conventional vehicles, revision or reconfiguration of the auxiliary frame must often be carried out, depending on a particular vehicle type which has a vehicle frame with a certain frame geometry, thereby increasing the assembly effort and cost outlay for vehicle production.

DE 199 22 800 A1 discloses an auxiliary frame for a motor vehicle comprising crossmembers and longitudinal members, which are connected to one another by nodal elements composed of a light metal cast material.

DE 199 09 945 C1 discloses a subframe for a motor vehicle comprising a framework that comprises crossmembers connected to longitudinal members.

SUMMARY

It is the object of the present disclosure to provide a modular auxiliary frame which can be used to advantage with different vehicle frames having different frame geometries.

This object is achieved by the features of the independent claims. Advantageous examples of the disclosure form the subject matter of the dependent claims, the description and the attached figures.

The present disclosure is based on the realization that the above object can be achieved by a longitudinal member of an auxiliary frame, which has an adapter socket to accommodate different attachment adapters. The different attachment adapters make it possible to fix the longitudinal member on different vehicle frames having different frame geometries, of the kind which are present on different vehicle types, for example.

Through the selection of a specific attachment adapter from a plurality of different attachment adapters and through the accommodation of the selected specific attachment adapter in the adapter socket of the longitudinal member, the longitudinal member can advantageously be adapted to a particular vehicle frame having a particular frame geometry.

According to a first aspect, the disclosure relates to an auxiliary frame for a vehicle, having at least one longitudinal member, wherein the longitudinal member has a longitudinal member end that has an adapter socket for accommodating different attachment adapters for fixing the longitudinal member on different vehicle frames having different frame geometries, and having an attachment adapter, which is accommodated in the adapter socket and is provided for fixing the longitudinal member on a particular vehicle frame.

The technical advantage is thereby achieved that the auxiliary frame is configured as a modular auxiliary frame, wherein different attachment adapters can be accommodated in the adapter socket of the longitudinal member. Through the selection and accommodation of a specifically selected attachment adapter in the adapter socket of the longitudinal member, the geometry of the longitudinal member can be adapted in an effective manner to a particular frame geometry of a particular vehicle frame.

Thus, the modular auxiliary frame can be used for a multiplicity of different frame geometries in different vehicle frames of different vehicle types without having to change the configuration of the longitudinal member, and the production and assembly effort are thereby reduced. All that is required is for an attachment adapter matched to a particular frame geometry to be accommodated in the adapter socket of the longitudinal member in order to adapt the longitudinal member to the particular frame geometry.

In order to ensure effective accommodation of the attachment adapter in the adapter socket of the longitudinal member, the attachment adapter is, in particular, connected in a materially integral manner, in particular welded, to the adapter socket of the longitudinal member.

In an advantageous example, the longitudinal member is formed from a metal, in particular aluminium and/or steel, or from a synthetic fibre composite.

In an advantageous example, the longitudinal member has a hollow profile.

In an advantageous example, the longitudinal member is configured as a curved longitudinal member.

In an advantageous example, the attachment adapter is formed as an extruded attachment adapter or as an attachment adapter having a hollow profile.

In an advantageous example, the adapter socket of the longitudinal member has a locating surface, wherein the attachment adapter has an adapter contact surface, which is connected, in particular welded, to the locating surface of the adapter socket.

The technical advantage is thereby achieved that particularly advantageous accommodation of the attachment adapter in the adapter socket of the longitudinal member is ensured. In this case, the adapter contact surface of the attachment adapter is, in particular, formed in a manner complementary to the locating surface of the adapter socket, thus ensuring advantageous fitting of the attachment adapter in the adapter socket.

In an advantageous example, the locating surface is configured as a concave locating surface, which is connected, in particular welded, to a convex adapter contact surface, or the locating surface is configured as a convex locating surface, which is connected, in particular welded, to a concave adapter contact surface.

The technical advantage is thereby achieved that a particularly advantageous complementary connection between the attachment adapter and the adapter socket is ensured by the connection of a respective concave or convex locating surface to a corresponding convex or concave adapter contact surface.

In an advantageous example, the attachment adapter has an adapter aperture, which is shaped to accommodate a mount, wherein, in particular, the attachment adapter has a hollow-cylindrical section, in which the adapter aperture is formed.

The technical advantage is thereby achieved that a mount can be accommodated in an advantageous manner in the adapter aperture of the attachment adapter. In particular, the mount can comprise a flexible mount, which comprises an inner sleeve, an elastically deformable sleeve surrounding the inner sleeve, and an outer sleeve surrounding the elastically deformable sleeve, wherein the outer sleeve can be pressed into the adapter aperture. In particular, the mount can comprise a non-flexible mount, in which fastening of the longitudinal member on the vehicle frame is ensured by a screwed joint.

In particular, a convex adapter contact surface of the attachment adapter can be configured as a cylindrical outer surface of the hollow-cylindrical section of the attachment adapter.

In an advantageous example, the longitudinal member has a further longitudinal member end, facing away from the longitudinal member end, that has a further adapter socket for accommodating different attachment adapters for fixing the longitudinal member on different vehicle frames having different frame geometries, wherein the auxiliary frame has a further attachment adapter, which is accommodated in the further adapter socket and is provided for fixing the longitudinal member on a particular vehicle frame.

The technical advantage is thereby achieved that one attachment adapter can advantageously be fixed on each of the two longitudinal member ends of the longitudinal member in order to ensure effective fixing of the auxiliary frame on a particular vehicle frame having a particular frame geometry. In particular, the attachment adapter and the further attachment adapter can have the same shape or different shapes.

In particular, the configuration of the further adapter socket corresponds to the configuration of the adapter socket.

In an advantageous example, the auxiliary frame has the longitudinal member and a second longitudinal member, wherein the second longitudinal member has a second longitudinal member end, which has a second adapter socket for accommodating different attachment adapters for fixing the second longitudinal member on different vehicle frames having different frame geometries, wherein the auxiliary frame has a second further attachment adapter, which is accommodated in the second adapter socket and is provided for fixing the second longitudinal member on a particular vehicle frame.

The technical advantage is thereby achieved that attachment adapters can be fixed in an effective manner in the respective adapter sockets of the two longitudinal members in order to ensure effective fixing of the auxiliary frame on a particular vehicle frame having a particular frame geometry. In particular, the attachment adapter, the further attachment adapter and/or the second attachment adapter can have the same shape or different shapes.

The configuration of the second longitudinal member, in particular the configuration of the adapter sockets of the second longitudinal member, corresponds, in particular, to the configuration of the first longitudinal member, in particular the configuration of the adapter sockets of the first longitudinal member.

In an advantageous example, the second longitudinal member has a further second longitudinal member end, facing away from the second longitudinal member end, that has a further second adapter socket for accommodating different attachment adapters for fixing the second longitudinal member on different vehicle frames having different frame geometries, wherein the auxiliary frame has a further second attachment adapter, which is accommodated in the further second adapter socket and is provided for fixing the second longitudinal member on a particular vehicle frame.

The technical advantage is thereby achieved that one attachment adapter can advantageously be fixed on each of the two longitudinal member ends of the second longitudinal member in order to ensure effective fixing of the auxiliary frame on a particular vehicle frame having a particular frame geometry. In particular, the attachment adapter, the further attachment adapter, the second attachment adapter and/or the further second attachment adapter can have the same shape or different shapes.

The configuration of the second and/or further second adapter socket corresponds, in particular, to the configuration of the adapter socket and/or the further adapter socket.

In an advantageous example, the at least one attachment adapter is configured as an elongate attachment adapter, which extends along an adapter longitudinal axis, wherein the elongate attachment adapter has an adapter wall, which has a hollow-cylindrical section, in which an adapter aperture is formed, which is configured to accommodate a mount.

The technical advantage is thereby achieved that the use of the elongate attachment adapter ensures effective fixing of the auxiliary frame on a particular vehicle frame having a particular frame geometry. In particular, the adapter wall of the elongate attachment adapter has an adapter contact surface, in particular a convex or concave adapter contact surface, which is connected to a correspondingly complementary locating surface, in particular a concave or convex locating surface. In this case, the adapter longitudinal axis extends, in particular, from the adapter contact surface to an adapter end face of the attachment adapter which faces away from the adapter contact surface. In particular, the hollow-cylindrical section of the adapter wall is formed on the adapter end face of the elongate attachment adapter.

In an advantageous example, the adapter wall of the elongate attachment adapter delimits an adapter aperture in the form of an elongate hole, and wherein, in particular in the adapter aperture in the form of an elongate hole, at least one reinforcing rib is arranged, which is connected to the adapter wall.

The technical advantage is thereby achieved that the arrangement of an adapter aperture in the form of an elongate hole in the elongate attachment adapter makes it possible to reduce the weight of the elongate attachment adapter, and that the at least one reinforcing rib, in particular two, three or four reinforcing ribs, can ensure a particularly stable structure of the elongate attachment adapter. In particular, the adapter wall has a hollow-cylindrical section. In particular, the adapter wall of the elongate attachment adapter has an adapter contact surface, in particular a convex or concave adapter contact surface, which is connected to a locating surface, in particular a concave or convex locating surface, of the adapter socket. In particular, the adapter aperture in the form of an elongate hole extends from the adapter contact surface to the hollow-cylindrical section of the elongate attachment adapter.

In an advantageous example, the at least one attachment adapter is configured as a hollow-cylindrical attachment adapter, wherein the although-cylindrical attachment adapter has an adapter wall, which has a hollow-cylindrical section, in which an adapter aperture is formed, which is configured to accommodate a mount.

The technical advantage is thereby achieved that the configuration of the attachment adapter as a hollow-cylindrical attachment adapter provides a particularly compact and stable attachment adapter. In particular, the hollow-cylindrical section of the adapter wall corresponds to the hollow-cylindrical attachment adapter. In particular, the adapter wall of the hollow-cylindrical attachment adapter has a convex or concave adapter contact surface, which is connected to a concave or convex locating surface of the adapter socket.

In an advantageous example, at least one crossmember socket is formed on the at least one longitudinal member, wherein the auxiliary frame has at least one crossmember, wherein the crossmember is accommodated in the crossmember socket, and wherein, in particular, the crossmember is fixed by materially integral joining, in particular welding, in the crossmember socket.

The technical advantage is thereby achieved that a particularly stable auxiliary frame is obtained through the materially integral fixing of the crossmember in the crossmember socket of the longitudinal member. In particular, the at least one crossmember is configured as a crossmember which extends in a rectilinear manner. In particular, the at least one crossmember is formed from a metal, in particular aluminium and/or steel, or from a synthetic fibre composite. In particular, the at least one crossmember has a hollow profile.

In an advantageous example, the auxiliary frame has a longitudinal member and a second longitudinal member, and the auxiliary frame has a first and second crossmember extending transversely to the first and second longitudinal member, wherein the longitudinal member has a first crossmember socket, in which the first crossmember is fixed in a materially integral manner, wherein the longitudinal member has a further crossmember socket, in which the second crossmember is fixed in a materially integral manner, wherein the second longitudinal member has a second crossmember socket, in which the first crossmember is fixed in a materially integral manner, wherein the second longitudinal member has a further second crossmember socket, in which the second crossmember is fixed in a materially integral manner.

The technical advantage is thereby achieved that a particularly stable auxiliary frame is obtained through the use of two longitudinal members and two crossmembers.

In an advantageous example, the at least one longitudinal member has at least one connecting element, which is configured to connect the at least one longitudinal member to a running gear component and/or a vehicle frame, and wherein, in particular, the connecting element has a first and a second flange, which delimit a connecting aperture for accommodating the running gear component or the vehicle frame.

The technical advantage is thereby achieved that effective connection between the respective longitudinal member and the corresponding running gear component or vehicle frame is provided by the at least one connecting element. Through the use of flanges, a corresponding running gear component or a section of the vehicle frame can advantageously be introduced into the connecting aperture between the two flanges and fixed within the connecting aperture.

In an advantageous example, the connecting element is configured as an adapted connecting element for connecting the at least one longitudinal member to a particular running gear component and/or a particular vehicle frame, wherein the adapted connecting element comprises, in particular, holes, milled features and/or elongate holes, which are configured to connect the adapted connecting element to the particular running gear component and/or to the particular vehicle frame.

The technical advantage is thereby achieved that a universal longitudinal member for connection to different running gear components and/or different vehicle frames can be adapted to a particular running gear component and/or to a particular vehicle frame by introducing specific holes, milled features and/or longitudinal holes into the connecting element.

In an advantageous example, the at least one attachment adapter ends flush with an upper side and/or lower side of the at least one adapter socket, or the at least one attachment adapter projects beyond an upper side and/or lower side of the at least one adapter socket.

The technical advantage is thereby achieved that further possibilities of adapting the longitudinal member to a particular vehicle frame having a particular frame geometry are made possible through a variable position of the attachment adapter within the adapter socket. If the attachment adapter projects beyond the upper side of the adapter socket, in particular, the connection point between the mount accommodated in the attachment adapter and the vehicle frame can be extended upwards beyond the upper side of the adapter socket. If the attachment adapter projects beyond the lower side of the adapter socket, in particular, the connection point between the mount accommodated in the attachment adapter and the vehicle frame can be extended downwards beyond the lower side of the adapter socket. If the attachment adapter ends flush particularly with the lower side and the upper side of the adapter socket, the connection point between the mount accommodated in the attachment adapter and the vehicle frame is arranged between the upper side and the lower side of the adapter socket.

In an advantageous example, the at least one attachment adapter has an adapter longitudinal axis, which extends from an adapter contact surface to an adapter end face facing away from the adapter contact surface, and an adapter transverse axis, which extends transversely to the adapter longitudinal axis, wherein the at least one adapter socket of the at least one longitudinal member has a socket transverse axis, which extends from a first longitudinal side to a second longitudinal side of the adapter socket, said longitudinal side facing away from the first longitudinal side, wherein the adapter transverse axis slopes relative to the socket transverse axis or extends parallel to the socket transverse axis in an adapter plane defined by the adapter longitudinal axis and by the socket transverse axis.

The technical advantage is thereby achieved that, by virtue of the parallel or angled pass of the axis, a corresponding straight or angled connection of the attachment adapter can be adapted in a variable manner according to the geometry of the vehicle frame.

In an advantageous example, the at least one adapter socket of the longitudinal member has a socket axis, which extends from an upper side to a lower side of the adapter socket, said lower side facing away from the upper side, and the at least one attachment adapter has a hollow-cylindrical section accommodated in the adapter socket, wherein the hollow-cylindrical section has a cylinder longitudinal axis, which slopes relative to the socket axis or extends parallel to the socket axis in a plane defined by the cylinder longitudinal axis and the socket axis.

The technical advantage is thereby achieved that further possibilities of adapting e longitudinal member to a particular vehicle frame having a particular frame geometry are made possible through a slope of the attachment adapter within the adapter socket. If the cylinder longitudinal axis of the hollow-cylindrical section of the attachment adapter encloses, in particular, a slope angle with the socket axis of the adapter socket, a mount accommodated in the attachment adapter also slopes in a corresponding manner, thus enabling the vehicle frame attached by the mount to be arranged offset relative to the auxiliary frame. If, on the other hand, the cylinder longitudinal axis and the socket axis extend in parallel, a mount accommodated in the attachment adapter does not slope either, and therefore the vehicle frame attached by the mount can be arranged above or below the auxiliary frame.

In an advantageous example, the at least one adapter socket of the longitudinal member has a socket axis, which extends from an upper side to a lower side of the adapter socket, said lower side facing away from the upper side, wherein a socket transverse axis extends transversely to the socket axis, and the at least one attachment adapter has a hollow-cylindrical section accommodated in the adapter socket, wherein the hollow-cylindrical section has a cylinder longitudinal axis, which slopes relative to the socket axis or extends parallel to the socket axis in a further plane defined by the socket transverse axis and the socket axis.

The technical advantage is thereby achieved that a slope of a cylinder longitudinal axis relative to the socket axis in the further plane ensures a further flexible possibility of attachment of the attachment adapter.

In an advantageous example, the at least one longitudinal member and/or the at least one crossmember is formed from a casting, or the at least one longitudinal member and/or the at least one crossmember is formed as a formed tubular part.

The technical advantage is thereby achieved that stable shaped parts can be obtained through the configuration of the longitudinal members and/or crossmembers as castings or formed tubular parts. Here, a formed a tubular part of this kind can be produced by forming a blank of U-shaped or O-shaped cross section.

In an advantageous example, the at least one attachment adapter is formed as an extruded attachment adapter or as an attachment adapter having a hollow profile.

The technical advantage is thereby achieved that an extruded attachment adapter can be produced in a particularly advantageous manner in the context of an extrusion process, e.g. in the case of attachment adapters consisting of aluminium, and that an attachment adapter having a hollow profile can be produced in a particularly advantageous manner, e.g. in the case of attachment adapters consisting of steel.

According to a second aspect, the disclosure relates to an attachment adapter for fixing a longitudinal member of an auxiliary frame on a particular vehicle frame of a vehicle, wherein the attachment adapter has a hollow-cylindrical section, which can be accommodated in an adapter socket of the longitudinal member.

The technical advantage is thereby achieved that, through the selection of a particular attachment adapter from a plurality of different attachment adapters to fix a longitudinal member on different vehicle frames, the longitudinal member can advantageously be adapted to a particular frame geometry of a particular vehicle frame by means of the particular attachment adapter. The configuration of the attachment adapter as an attachment adapter allows the versatile production of differently shaped attachment adapters which have a high mechanical stability.

In an advantageous example, an adapter aperture, which is shaped to accommodate a mount, is formed in the hollow-cylindrical section of the attachment adapter.

The technical advantage is thereby achieved that advantageous attachment of the longitudinal member to the vehicle frame is ensured by means of a mount accommodated in the adapter aperture.

In an advantageous example, the attachment adapter has an adapter contact surface, which can be connected, in particular welded, to a locating surface of the adapter socket of the longitudinal member.

The technical advantage is thereby achieved that, by virtue of the adapter contact surface of the attachment adapter, the attachment adapter can be fixed in a particularly effective manner on a correspondingly complementary locating surface of the adapter socket of the longitudinal member. In particular, the adapter contact surface is configured as a convex or concave adapter contact surface, which can be connected, in particular welded, to a correspondingly complementary concave or convex locating surface of the adapter socket of the longitudinal member.

In an advantageous example, the attachment adapter is configured as an elongate attachment adapter, which extends along an adapter longitudinal axis, wherein the elongate attachment adapter has an adapter wall, which has the hollow-cylindrical section, wherein, in particular, the adapter wall of the elongate attachment adapter delimits an adapter aperture in the form of an elongate hole, in which, in particular, at least one reinforcing rib is arranged, which is connected to the adapter wall.

The technical advantage is thereby achieved that, by virtue of the elongate shape of the elongate attachment adapter, the hollow-cylindrical section can be offset along the adapter longitudinal axis away from a contact point between the elongate attachment adapter and the adapter socket of the longitudinal member. As a result, the elongate attachment adapter can bridge any clearance which is present between the vehicle frame and the auxiliary frame. By virtue of the adapter aperture in the form of an elongate hole which is present in particular, the outlay on materials and the weight of the elongate attachment adapter can be reduced. By means of the reinforcing ribs which are arranged, in particular, in the adapter aperture in the form of an elongate hole, high stability of the elongate attachment adapter can be ensured.

In an advantageous example, the attachment adapter is configured as a hollow-cylindrical attachment adapter, wherein the hollow-cylindrical attachment adapter has an adapter wall, which has the hollow-cylindrical section.

The technical advantage is thereby achieved that the hollow-cylindrical attachment adapter allows advantageous compact and stable attachment of the longitudinal member to the vehicle frame.

According to a third aspect, the disclosure relates to a method for producing a longitudinal member, comprising the following method steps: selecting at least one attachment adapter from a plurality of different attachment adapters, which are assigned to different vehicle frames having different frame geometries, wherein the selected attachment adapter is assigned to the given vehicle frame having the given frame geometry, supplying at least one longitudinal member, wherein the longitudinal member has a longitudinal member end that has an adapter socket for accommodating different attachment adapters for fixing the longitudinal member on different vehicle frames having different frame geometries, introducing the selected attachment adapter into the adapter socket of the longitudinal member, and fixing, in particular fixing in a materially integral manner, the selected attachment adapter in the adapter socket of the longitudinal member.

The technical advantage is thereby achieved that, through the specific selection of a particular attachment adapter from a plurality of different attachment adapters, effective adaptation of the longitudinal member to a given frame geometry of a given vehicle frame is achieved. Here, the method comprises, in particular, selecting a multiplicity, in particular two, three or four, selected attachment adapters, which are fixed in corresponding adapter sockets of the at least one longitudinal member.

In an advantageous example, the fixing of the selected attachment adapter in a materially integral manner in the adapter socket of the longitudinal member comprises welding the selected attachment adapter in the adapter socket of the longitudinal member.

In an advantageous example, the longitudinal member has at least one connecting element, which is configured to connect the longitudinal member to different running gear components and/or different vehicle frames, wherein the supplying of the longitudinal member comprises adapting the connecting element for the connection of the longitudinal member to a particular running gear component and/or a particular vehicle frame.

The technical advantage is thereby achieved that universally shaped longitudinal members, which can be connected to a multiplicity of different running gear components and/or different vehicle frames, can be provided by the at least one connecting element. If the at least one longitudinal member is to be connected to a particular running gear component and/or to a particular vehicle frame, corresponding specific adaptation of the connecting element to the particular running gear component and/or to the particular vehicle frame is performed.

In particular, adaptation of the connecting element comprises the introduction of holes, milled features and/or elongate holes into the connecting element in order to adapt the connecting element to the particular running gear component and/or to the particular vehicle frame. In this case, the adaptation of the connecting element can comprise, in particular, the provision of a particular template, by means of which particular holes, milled features and/or elongate holes can be introduced into the connecting element.

BRIEF DESCRIPTION OF THE DRAWINGS

Further examples of the present disclosure are explained with reference to the attached figures.

DETAILED DESCRIPTION

Figure 1:
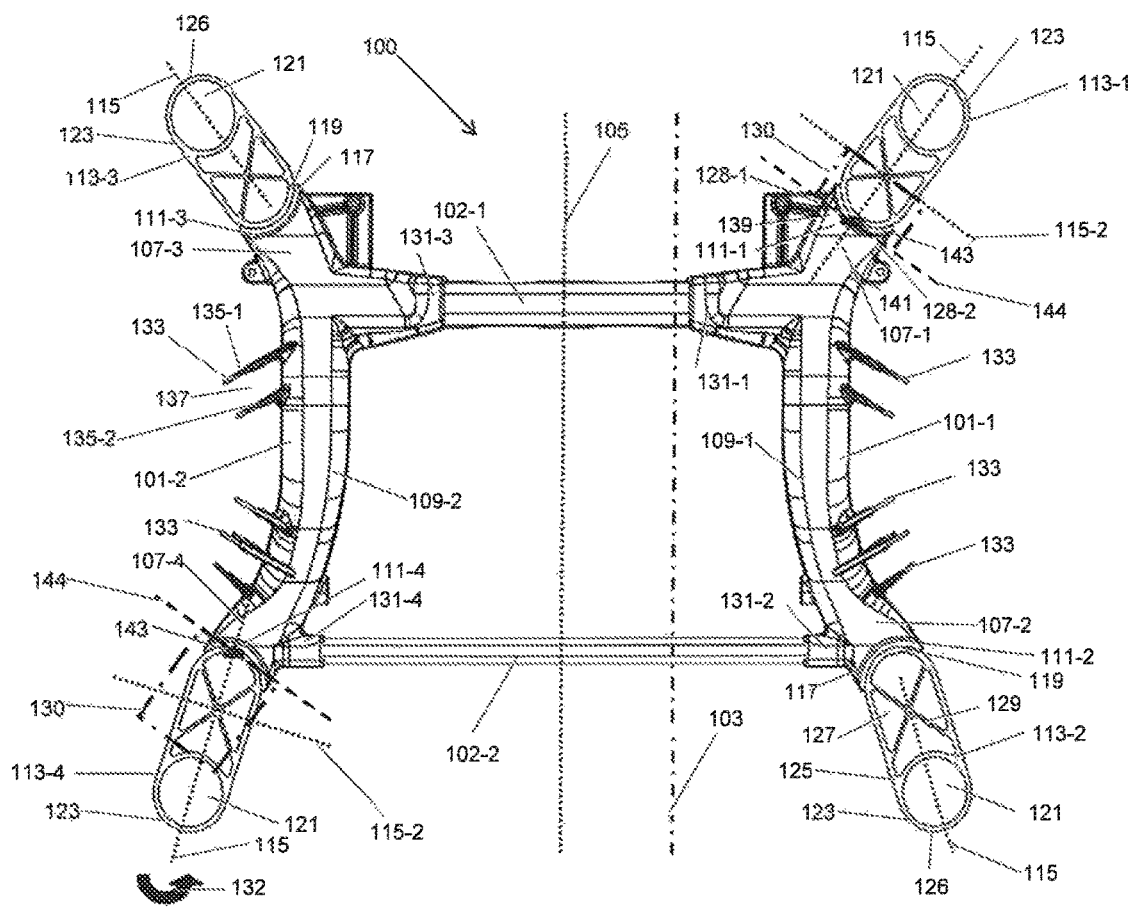
FIG. 1 shows an auxiliary frame according to a first example.

FIG. 1 shows a perspective illustration of an auxiliary frame 100 according to a first example. The auxiliary frame 100 is used in a vehicle and is operatively connected to a vehicle frame. The auxiliary frame 100 furthermore allows attachment of running gear components, e.g. running gear members. The connection between the auxiliary frame 100 and the vehicle frame can be enabled by isolated mounting, e.g. by means of flexible mounting, or by non-isolated mounting, e.g. by means of a screwed joint. By means of isolated mounting, e.g. by means of flexible mounts, effective vibration isolation can be achieved, thereby making it possible to reduce noise which arises. By means of non-isolated mounting, e.g. by means of a screwed joint, stable connection between the auxiliary frame 100 and the vehicle frame can be achieved.

The auxiliary frame 100 illustrated in FIG. 1 has a longitudinal member 101-1 and a second longitudinal member 101-2 as well as a first crossmember 102-1 and a second crossmember 102-2, in this arrangement, the first and second crossmembers 102-1, 102-2 extend transversely to the longitudinal member 101-1 and to the second longitudinal member 101-2. In the installed state of the auxiliary frame 100, the longitudinal member 101-1 and the second longitudinal member 101-2 extend substantially in a direction of travel 103 illustrated schematically in FIG. 1, and the first and second crossmembers 102-1, 102-2 extend substantially transversely to the direction of travel 103.

In this case, the longitudinal member 101-1 and the second longitudinal member 101-2 are formed as castings and have a hollow profile. In particular, the first and second crossmembers 102-1, 102-2 can likewise be formed as castings and/or have a hollow profile. In particular, the crossmembers 102-1, 102-2 are here formed as rectilinearly extending crossmembers 102-1, 102-2. As an alternative, the longitudinal members 101-1, 101-2 and/or the crossmembers 102-1, 102-2 can also be formed as formed tubular parts, wherein a formed tubular part of this kind can be produced by forming a blank of U-shaped or O-shaped cross section.

In contrast, the longitudinal members 101-1, 101-2 are formed as curved longitudinal members 101-1, 101-2. In relation to an auxiliary frame centre line 105, which is arranged in the centre between longitudinal members 101-1, 101-2 and extends transversely to the crossmembers 102-1, 102-2, the longitudinal member 101-1 and the second longitudinal member 101-2 are arranged in a substantially mirror-symmetrical manner.

The longitudinal member 101-1 has a longitudinal member end 107-1 and a further longitudinal member end 107-2 remote from longitudinal member end 107-1, wherein a first main longitudinal-member section 109-1 is arranged between the two longitudinal member ends 107-1, 107-2. The second longitudinal member 101-2 has a second longitudinal member end 107-3 and a further second longitudinal member end 107-4 remote from the second longitudinal member end 107-3, wherein a second main longitudinal-member section 109-2 is arranged between the two longitudinal member ends 107-3, 107-4.

As illustrated in FIG. 1, the respective longitudinal member ends 107-1, 107-2, 107-3, 107-4 of the respective curved longitudinal member 101-1, 101-2 are curved relative to the respective main longitudinal-member section 109-1, 109-2 in a direction away from the crossmembers 102-1, 102-2, in particular being curved in a direction away from the auxiliary frame centre line 105.

An adapter socket 111-1 for accommodating different attachment adapters 113-1, 113-2, 113-3, 113-4 is formed on the longitudinal member end 107-1 of the longitudinal member 101-1, wherein the different attachment adapters 113-1, 113-2, 113-3, 113-4 are formed for fixing the longitudinal member 101-1 on different vehicle frames having different frame geometries. The attachment adapter 113-1 accommodated in the adapter socket 111-1 is provided for fixing the longitudinal member 101-1 on a particular vehicle frame.

A further adapter socket 111-2 for accommodating different attachment adapters 113-1, 113-2, 113-3, 113-4 is formed on the further longitudinal member end 107-2 of the longitudinal member 101-1, The further attachment adapter 113-2 accommodated in the further adapter socket 111-2 is likewise provided for fixing the longitudinal member 101-1 on a particular vehicle frame.

A second adapter socket 111-3 for accommodating different attachment adapters 113-1, 113-2, 113-3, 113-4 is formed on the second longitudinal member end 107-3 of the second longitudinal member 101-2. The second attachment adapter 113-3 accommodated in the second adapter socket 111-3 is provided for fixing the second longitudinal member 101-2 on a particular vehicle frame.

A further second adapter socket 111-4 for accommodating different attachment adapters 113-1, 113-2, 113-3, 113-4 is formed on the further second longitudinal member end 107-4 of the second longitudinal member 101-2. The further second attachment adapter 113-4 accommodated in the further second adapter socket 111-4 is provided for fixing the second longitudinal member 101-2 on a particular vehicle frame.

In this arrangement, the respective attachment adapters 113-1, 113-2, 113-3, 113-4 are, in particular, configured as extruded attachment adapters 113-1, 113-2, 113-3, 113-4, being extruded, in particular, from aluminium, which can be produced in a particularly advantageous manner in the context of an extrusion process, or are, in particular, configured as attachment adapters 113-1, 113-2, 113-3, 113-4 having a hollow profile, consisting, in particular, of steel.

Here, the respective attachment adapters 113-1, 113-2, 113-3, 113-4 are fixed in a materially integral manner, in particular welded, in the respective adapter socket 111-1, 111-2, 111-3, 111-4.

As illustrated in FIG. 1, all the attachment adapters 113-1, 113-2, 113-3, 113-4 are configured as an elongate attachment adapter 113-1, 113-2, 113-3, 113-4 extending along an adapter longitudinal axis 115. Here, the adapter longitudinal axis 115 in each case extends from an adapter contact surface 119 of the respective attachment adapter 113-1, 113-2, 113-3, 113-4 to an adapter end face 126 facing away from the adapter contact surface 119.

The specific selection, illustrated in FIG. 1, of the corresponding attachment adapters 113-1, 113-2, 113-3, 113-4 allows advantageous fixing of the respective longitudinal members 101-1, 101-2 of the auxiliary frame 100 on a particular vehicle frame having a given frame geometry.

The respective adapter socket 111-1, 111-2, 111-3, 111-4 of the longitudinal members 101-1, 101-2 has a concave locating surface 117, The respective attachment adapter 113-1, 113-2, 113-3, 113-4 has a convex adapter contact surface 119, which is connected, in particular welded, to the concave locating surface 117 of the respective adapter socket 111-1, 111-2, 111-3, 111-4. Thus, effective fixing of the respective attachment adapter 113-1, 113-2, 113-3, 113-4 in the corresponding adapter socket 11'-111-2, 111-3, 111-4 is ensured. In an alternative example, the respective adapter socket 111-1, 111-2, 111-3, 111-4 of the longitudinal members 101-1, 101-2 can have a convex locating surface 117, which is connected, in particular welded, to a respective concave adapter contact surface 119.

The attachment adapters 113-1, 113-2, 113-3, 113-4 each have an adapter aperture 121, which is shaped to accommodate a mount, thus making it possible to ensure effective attachment of the auxiliary frame 100 to the vehicle frame by means of the mount.

As illustrated in FIG. 1, the attachment adapters 113-1, 113-2, 113-3, 113-4 are each configured as elongate attachment adapters 113-1, 113-2, 113-3, 113-4 extending along an adapter longitudinal axis 115. In this arrangement, the respective elongate attachment adapter 113-1, 113-2, 113-3, 113-4 has an adapter wall 125, which has a hollow-cylindrical section 123 of the elongate attachment adapter 113-1, 113-2, 113-3, 113-4, in which the respective adapter aperture 121 is formed, which is configured to accommodate a mount.

The adapter wall 125 of the elongate attachment adapter 113-1, 113-2, 113-3, 113-4 furthermore in each case delimits an adapter aperture 127 in the form of an elongate hole, wherein at least one reinforcing rib 129, in particular four reinforcing ribs 129, which is (are) connected to the adapter wall 125, is (are) arranged in the adapter aperture 127 in the form of an elongate hole. In particular, the reinforcing ribs 129 are configured as reinforcing ribs 129 extending crosswise. The reinforcing ribs 129 increase the stability of the elongate attachment adapter 113-1, 113-2, 113-3, 113-4.

If, in an example not illustrated in FIG. 1, a different vehicle frame having a different frame geometry is to be used, the attachment adapters 113-1, 113-2, 113-3, 113-4 accommodated in the respective adapter sockets 111-1, 111-2, 111-3, 111-4 of the longitudinal members 101-1, 101-2 can either be retained or replaced by differently shaped attachment adapters 113-1, 113-2, 113-3, 113-4. Thus, it is possible to fix either an elongate attachment adapter 113-1, 113-2, 113-3, 113-4 or, as an alternative, a hollow-cylindrical attachment adapter 113-1, 113-2, 113-3, 113-4 in each adapter socket 111-1, 111-2, 111-3, 111-4 in order to enable attachment of the auxiliary frame 100 to different frame geometries.

This simplifies the production of the auxiliary frame 100 since the shape of the longitudinal members 101-1, 101-2 does not have to be changed significantly when installing the auxiliary frame 100 in different vehicle types, it being possible to achieve advantageous attachment of the auxiliary frame 100 to a particular vehicle frame having a given frame geometry merely through the selection of the corresponding attachment adapter 113-1, 113-2, 113-3, 113-4.

In this case, the respective adapter sockets 111-1, 111-2, 111-3, 111-4 of the respective longitudinal member ends 107-1, 107-2, 107-3, 107-4 of the longitudinal members 101-1, 101-2 each have an upper side 139, a lower side 141 facing away from the upper side 139, a first longitudinal side 128-1 and a second longitudinal side 128-2 facing away from the first longitudinal side 128-1. Here, a socket axis 143 extends from the respective upper side 139 to the opposite lower side 141 of the respective longitudinal member end 107-1, 107-2, 107-3, 107-4. In this arrangement, a socket transverse axis 144 extending transversely to the socket axis 143 extends from the respective first longitudinal side 128-1 to the respective second longitudinal side 128-2 facing away therefrom.

The corresponding attachment adapters 113-1, 113-2, 113-3, 113-4 can be accommodated in a rectilinear or angled manner in the respective adapter sockets 111-1, 111-2, 111-3, 111-4.

The attachment adapter 113-1 and the second attachment adapter 113-3 are accommodated in a rectilinear manner in the corresponding adapter socket 111-1 and the corresponding second adapter socket 111-3. Here, an adapter transverse axis 115-2 extending transversely to the adapter longitudinal axis 115 in each case extends parallel to the socket transverse axis 144 in an adapter plane 130 defined by the socket transverse axis 144 and the adapter longitudinal axis 115.

In contrast, the further attachment adapter 113-2 and the further second attachment adapter 113-4 are accommodated in an angled manner in the corresponding further adapter socket 111-2 and the corresponding further second adapter socket 111-4. Here, an adapter transverse axis 115-2 extending transversely to the adapter longitudinal axis 115 in each case extends at an angle to the socket transverse axis 144 in an adapter plane 130 defined by the socket transverse axis 144 and the adapter longitudinal axis 115. Thus, the further second attachment adapter 113-4 is accommodated in the further second adapter socket 111-4 in a manner rotated in a direction of rotation 132, for example.

By virtue of the rectilinear or angled arrangement of the attachment adapters 113-1, 113-2, 113-3, 113-4, the respective positions of the mounts accommodated in the adapter apertures 121 can be adapted to the running gear component in an effective manner, thereby ensuring flexible attachment of the auxiliary frame 100.

In order to ensure effective arrangement of the crossmembers 102-1, 102-2 within the auxiliary frame 100, the longitudinal member 101-1 has a first crossmember socket 131-1, in which the first crossmember 102-1 is fixed in a materially integral manner, the longitudinal member 101-1 has a further crossmember socket 131-2, in which the second crossmember 102-2 is fixed in a materially integral manner, the second longitudinal member 101-2 has a second crossmember socket 131-3, in which the first crossmember 102-1 is fixed in a materially integral manner, and the second longitudinal member 101-2 has a further second crossmember socket 131-4, in which the second crossmember 102-2 is fixed in a materially integral manner.

In this arrangement, effective fixing in a materially integral manner between the crossmembers 102-1, 102-2 and the respective crossmember sockets 131-1, 131-2, 131-3, 131-4 can be ensured, in particular, by a weld between the crossmembers 102-1, 102-2 and the corresponding crossmember sockets 131-1, 131-2, 131-3, 131-4 of the respective longitudinal members 101-1, 101-2.

In order to ensure effective fixing of the auxiliary frame 100 on the vehicle frame, the longitudinal member 101-1 and/or the second longitudinal member 101-2 has at least one connecting element 133, which is configured to connect the first and/or second longitudinal member 101-1, 101-2 to a running gear component and/or a vehicle frame.

Here, the respective connecting element 133 has a first flange 135-1 and a second flange 135-2, which deliver a connecting aperture 137 for accommodating the running gear component or the vehicle frame of the vehicle. In this arrangement, the flanges 135-1, 135-2 can have, in particular, flange holes 138 (not illustrated in FIG. 1).

Figure 2:
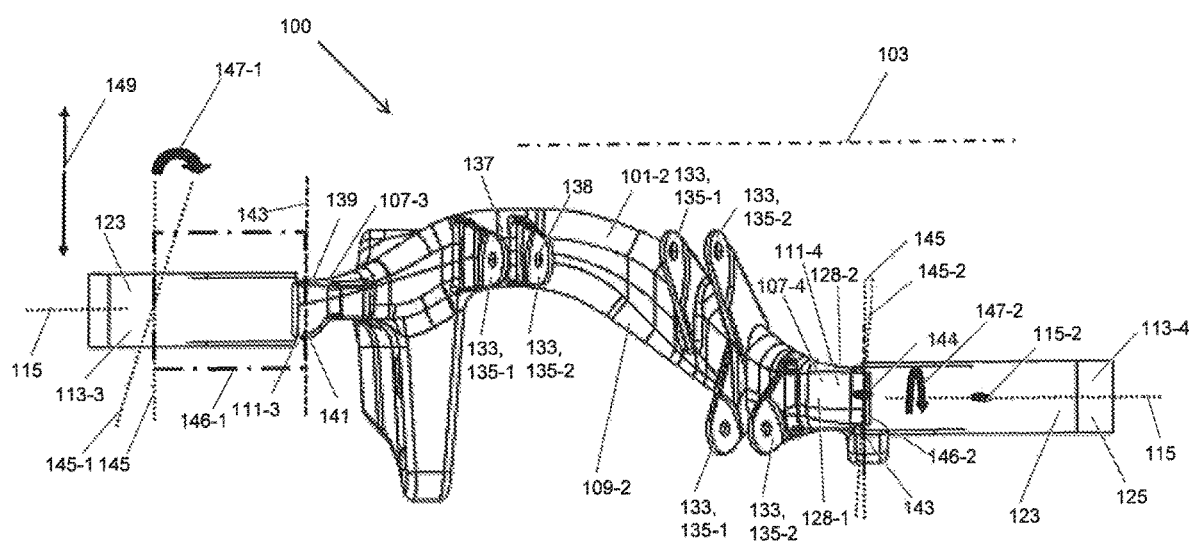
FIG. 2 shows an auxiliary frame according to a first example in side view.

FIG. 2 shows an auxiliary frame according to the first example in side view. For detailed information on the auxiliary frame 100 according to the first example, reference is made to the statements in relation to FIG. 1.

The auxiliary frame 100 according to the first example has a longitudinal member 101-1, a second longitudinal member 101-2 as well as a first crossmember 102-1 and a second crossmember 102-2, wherein only the second longitudinal member 101-2 is visible in the illustration according to FIG. 2.

The second longitudinal member 101-2 has a second longitudinal member end 107-3 and a further second longitudinal member end 107-4 remote from the second longitudinal member end 107-3, wherein a second main longitudinal-member section 109-2 is arranged between the two longitudinal member ends 107-3, 107-4.

A second adapter socket 111-3, in which a second attachment adapter 113-3 is accommodated, is formed on the second longitudinal member end 107-3 of the second longitudinal member 101-2. A further second adapter socket 111-4, in which a further second attachment adapter 113-4 is accommodated, is formed on the further second longitudinal member end 107-4 of the second longitudinal member 101-2.

The respective adapter socket 111-3, 111-4 in each case has an upper side 139 and a lower side 141. A first longitudinal side 128-1 and a second longitudinal side 128-2 of the respective adapter socket 111-3, 111-4, said second longitudinal side being situated opposite the first longitudinal side 128-1, are illustrated only schematically in FIG. 2.

The second and the further second attachment adapter 113-3, 113-4 are each configured as elongate attachment adapters 113-3, 113-4 extending along an adapter longitudinal axis 115. In this arrangement, the respective elongate attachment adapters 113-3, 113-4 have an adapter wall 125, which delimits a hollow-cylindrical section 123 of the respective elongate attachment adapter 113-3, 113-4, in which an adapter aperture 121 (not illustrated in FIG. 2) is formed, which is configured to accommodate a mount.

As illustrated in FIG. 2, the second and the further second attachment adapter 113-3, 113-4 project beyond the upper side 139 of the respective adapter socket 111-3, 111-4 and beyond the lower side 141 of the respective adapter socket 111-3, 111-4. In an alternative example, the second and the further second attachment adapter 113-3, 113-4 end flush, in particular, with the upper side 139 and/or the lower side 141 of the respective adapter socket 111-3, 111-4.

As illustrated in FIG. 2, the respective adapter socket 111-3, 111-4 has a socket axis 143, which extends from the upper side 139 to the lower side 141 of the respective adapter socket 111-3, 111-4.

The hollow-cylindrical section 123 of the respective attachment adapter 113-3, 113-4 has a cylinder longitudinal axis 145. In this case, the cylinder longitudinal axis 145 of the respective attachment adapter 113-3, 113-4 extends parallel to the socket axis 143 of the respective adapter socket 111-3, 111-4.

In another example (not illustrated in FIG. 2), the respective attachment adapter 113-3, 113-4 can be arranged in such a way as to slope relative to the corresponding adapter socket 111-3, 111-4.

In a first case, the cylinder longitudinal axis 145 of the attachment adapter 113-3, 113-4 slopes relative to the socket axis 143 in a slope direction 147-1 indicated only schematically in FIG. 2, in particular in a plane 146-1 indicated only schematically in FIG. 2. Here, the plane 146 is defined by the cylinder longitudinal axis 145 and by the socket axis 143 and lies in the plane of the figure. The sloping cylinder longitudinal axis 145-1, which is the first in the plane of the figure in accordance with the first case, is indicated schematically.

In a second case, the cylinder longitudinal axis 145 of the attachment adapter 113-3, 113-4 slopes relative to the socket axis 143 in a further slope direction 147-2 indicated only schematically in FIG. 2, in particular in a further plane 146-2 indicated only schematically in FIG. 2. Here, the further plane 146-2 is defined by the socket axis 143 and by a socket transverse axis 144 extending transversely to the socket axis 143 and is perpendicular to the plane of the figure. The sloping cylinder longitudinal axis 145-2, which is the second, corresponding to the second case, is indicated only schematically and slopes from the plane of the figure in a direction which extends behind the plane of the figure. Here, the slope direction 147-2 corresponds to a rotation of the cylinder longitudinal axis 145 relative to the adapter longitudinal axis 115.

In this case, a slope in accordance with the first case and a slope in accordance with the second case, or a rotation illustrated in FIG. 1, can be combined.

By means of a different slope angle between the cylinder longitudinal axis 145 and the socket axis 143, the respective attachment adapter 113-3, 113-4 can be adapted in an effective manner to a particular frame geometry of a particular vehicle frame.

Furthermore, the respective attachment adapter 113-3, 113-4 can be moved in a vertical direction 149 along the socket axis 143 in the corresponding adapter socket 111-3, 111-4 and then connected to the corresponding adapter socket 111-3, 111-4. An attachment adapter 113-3, 113-4 which is offset upwards or downwards in the vertical direction 149 relative to the corresponding adapter socket 111-3, 111-4 allows effective adaptation of the auxiliary frame 100 to a particular frame geometry of a particular vehicle frame.

Even if only the second attachment adapter 113-3 and the further second attachment adapter 113-4 are shown in FIG. 2, a correspondingly sloping, rotated and/or vertically moved attachment is also applicable for the attachment adapter 113-1 and the further attachment adapter 113-2 illustrated in FIG. 1.

Even if only one elongate attachment adapter 113-3, 113-4 is shown in the view illustrated in FIG. 2, there can also be a correspondingly sloping, rotated and/or vertically moved attachment between a hollow-cylindrical attachment adapter 113-1, 113-2, 113-3, 113-4 and an adapter socket 111-1, 111-111-3, 111-4.

Figure 3:
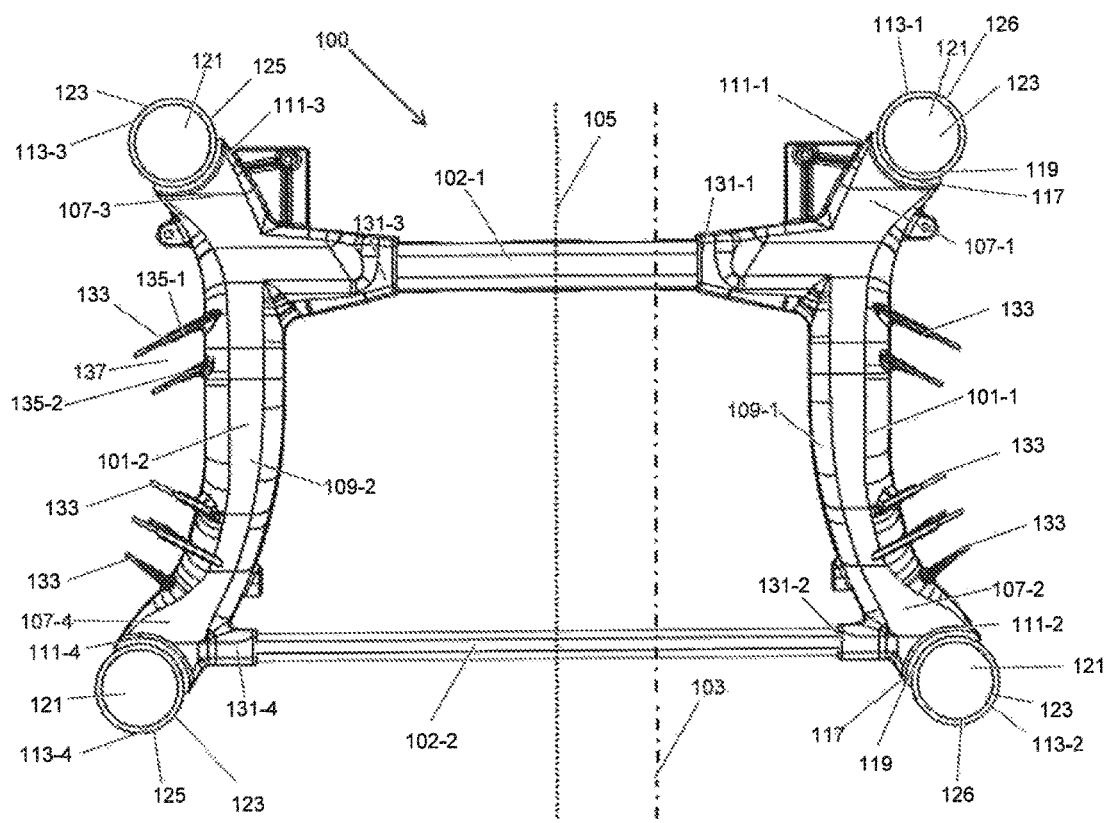
FIG. 3 shows an auxiliary frame according to a second example.

FIG. 3 shows an auxiliary frame according to a second example. The auxiliary frame 100 according to the second example, which is shown in FIG. 3, corresponds to the auxiliary frame 100 according to the first example, which is illustrated in FIGS. 1 and 2, apart from the fact that, instead of the elongate attachment adapter 113-1, 113-2, 113-3, 113-4, hollow-cylindrical attachment adapters 113-1, 113-2, 113-3, 113-4 are used in the second example.

As illustrated in FIG. 3, the attachment adapters 113-1, 113-2, 113-3, 113-4 are each configured as a hollow-cylindrical attachment adapter 113-1, 113-2, 113-3, 113-4, wherein the adapter aperture 121 is formed in the adapter wall 125 of the hollow-cylindrical attachment adapter 113-1, 113-2, 113-3, 113-4. Here, a hollow-cylindrical section 123 of the adapter wall 125 corresponds to the hollow-cylindrical attachment adapter 113-1, 113-2, 113-3, 113-4. In this case, the respective convex adapter contact surface 119, which is connected to the corresponding concave locating surface 117 of the adapter sockets 111-1, 111-2, 111-3, 111-4, corresponds to a hollow-cylinder outer surface of the hollow-cylindrical attachment adapter 113-1, 113-2, 113-3, 113-4. In an alternative example, the respective adapter socket 111-1, 111-2, 111-3, 111-4 can have a convex locating surface 117, which is connected, in particular welded, to a respective concave adapter contact surface 119.

Figure 4:
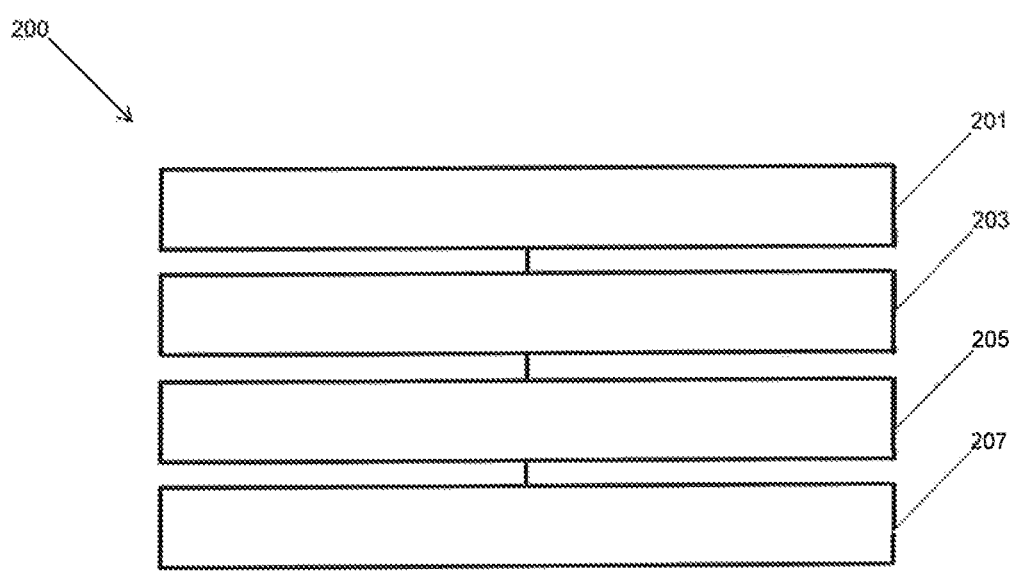
FIG. 4 shows a schematic illustration of a method for producing a longitudinal member.

FIG. 4 shows a schematic illustration of a method for producing a longitudinal member.

As a first method step, the method 200 comprises selecting 201 at least one attachment adapter 113-1, 113-2, 113-3, 113-4 from a plurality of different attachment adapters 113-1, 113-2, 113-3, 113-4, which are assigned to different vehicle frames having different frame geometries, wherein the selected attachment adapter 113-1, 113-2, 113-3, 113-4 is assigned to the given vehicle frame having the given frame geometry.

As a second method step, the method 200 comprises supplying 203 at least one longitudinal member 101-1, 101-2, wherein the longitudinal member 101-1, 102-2 has a longitudinal member end 107-1, 107-2, 107-3, 107-4 that has an adapter socket 111-1, 111-2, 111-3, 111-4 for accommodating different attachment adapters 113-1, 113-2, 113-3, 113-4 for fixing the longitudinal member 101-1, 101-2 on different vehicle frames having different frame geometries.

As a third method step, the method 200 comprises introducing 205 the selected attachment adapter 113-1, 113-2, 113-3, 113-4 into the adapter socket 111-1, 111-2, 111-3, 111-4 of the longitudinal member 101-1, 101-2.

As a fourth method step, the method 200 comprises fixing 207, in particular fixing 207 in a materially integral manner, the selected attachment adapter 113-1, 113-2, 113-3, 113-4 in the adapter socket 111-1, 111-2, 111-3, 111-4 of the longitudinal member 101-1, 101-2.

LIST OF REFERENCE NUMBERS 100 auxiliary frame
101-1 longitudinal member
101-2 second longitudinal member
102-1 first crossmember
102-2 second crossmember
103 direction of travel
105 auxiliary frame centre line
107-1 longitudinal member end
107-2 further longitudinal member end
107-3 second longitudinal member end
107-4 farther second longitudinal member end
109-1 first main longitudinal-member section
109-2 second main longitudinal-member section
111-1 adapter socket
111-2 further adapter socket
111-3 second adapter socket
111-4 further second adapter socket
1131 attachment adapter
113-2 further attachment adapter
113-3 second attachment adapter
113-4 further second attachment adapter
115 adapter longitudinal axis
115-2 adapter transverse axis
117 locating surface
118-1 first longitudinal side of the adapter socket
118-2 second longitudinal side of the adapter socket
119 adapter contact surface
121 adapter aperture
123 hollow-cylindrical section
125 adapter wall
126 adapter end face
127 adapter aperture in the form of an elongate hole
129 reinforcing rib
130 adapter plane
131-1 first crossmember socket
131-2 second crossmember socket
131-3 third crossmember socket
131-4 fourth crossmember socket
132 direction of rotation
133 connecting element
135-1 first flange
135-2 second flange
137 connecting aperture
138 flange holes 139 upper side of the adapter socket
141 lower side of the adapter socket
143 socket axis of the adapter socket
144 socket transverse axis of the adapter socket
145 cylinder longitudinal axis
145-1 first sloping cylinder longitudinal axis
145-2 second sloping cylinder longitudinal axis
146-1 plane
146-2 further plane
147-1 slope direction
147-2 further slope direction
149 vertical direction
200 method for producing a longitudinal member
201 method step: selecting an attachment adapter
203 method step: supplying a longitudinal member
205 method step: introducing the attachment adapter into the adapter socket of the longitudinal member
207 method step: fixing the attachment adapter in the adapter socket of the longitudinal member

What is claimed is:

1. An auxiliary frame for a vehicle, comprising:
a longitudinal member comprising a first longitudinal member end that comprises a first adapter socket, wherein the first adapter socket is configured to accommodate different attachment adapters configured to fix the longitudinal member on different vehicle frames comprising different frame geometries; and
a first attachment adapter in the first adapter socket, wherein the first attachment adapter is configured to fix the longitudinal member on a first vehicle frame;
wherein the first attachment adapter is configured as an elongate attachment adapter extending along an adapter longitudinal axis, wherein the elongate attachment adapter comprises an adapter wall that comprises a hollow-cylindrical section that is configured to accommodate a mount, and wherein an adapter aperture is formed in the hollow-cylindrical section.

2. The auxiliary frame according to claim 1, wherein the first adapter socket of the longitudinal member comprises a locating surface, wherein the first attachment adapter comprises an adapter contact surface connected to the locating surface of the first adapter socket.

3. The auxiliary frame according to claim 2, wherein the locating surface is configured as a concave locating surface that is connected to a convex adapter contact surface, or wherein the locating surface is configured as a convex locating surface that is connected to a concave adapter contact surface.

4. The auxiliary frame according to claim 1, wherein the adapter aperture is shaped to accommodate the mount.

5. The auxiliary frame according to claim 1, wherein the longitudinal member comprises a second longitudinal member end facing away from the first longitudinal member end, the second longitudinal member end comprising a second adapter socket configured to accommodate the different attachment adapters configured to fix the longitudinal member on the different vehicle frames comprising the different frame geometries, wherein the auxiliary frame comprises a second attachment adapter that is in the second adapter socket and is configured to fix the longitudinal member on a second vehicle frame.

6. The auxiliary frame according to claim 1, wherein the adapter wall of the elongate attachment adapter delimits the adapter aperture in the form of an elongate hole, and wherein a reinforcing rib is arranged in the adapter aperture in the form of the elongate hole and connected to the adapter wall.

7. The auxiliary frame according to claim 1, wherein the first attachment adapter is configured as a hollow-cylindrical attachment adapter.

8. The auxiliary frame according to claim 1, wherein a crossmember socket is formed on the longitudinal member, wherein the auxiliary frame comprises a crossmember fixed by materially integral joining in the crossmember socket.

9. The auxiliary frame according to claim 8, wherein the auxiliary frame comprises a first longitudinal member and a second longitudinal member, wherein the auxiliary frame comprises a first crossmember and a second crossmember extending transversely to the first longitudinal member and the second longitudinal member,
wherein the first longitudinal member comprises a first crossmember socket, the first crossmember is fixed in a materially integral manner in the first crossmember socket, wherein the first longitudinal member comprises a second crossmember socket, the second crossmember is fixed in a materially integral manner in the second crossmember socket,
wherein the second longitudinal member comprises a third crossmember socket, the first crossmember is fixed in a materially integral manner in the third crossmember socket, wherein the second longitudinal member comprises a fourth crossmember socket, the second crossmember is fixed in a materially integral manner in the fourth crossmember socket.

10. The auxiliary frame according to claim 1, wherein the longitudinal member comprises a connecting element configured to connect the longitudinal member to a running gear component or a vehicle frame, and wherein the connecting element comprises a first and a second flange that delimit a connecting aperture configured to accommodate the running gear component or the vehicle frame.

11. The auxiliary frame according to claim 1, wherein the first attachment adapter ends flush with an upper side or a lower side of the first adapter socket, or wherein the first attachment adapter projects beyond an upper side or a lower side of the first adapter socket.

12. The auxiliary frame according to claim 1, wherein the adapter longitudinal axis extends from an adapter contact surface to an adapter end face facing away from the adapter contact surface, and an adapter transverse axis that extends transversely to the adapter longitudinal axis, wherein the first adapter socket of the first longitudinal member comprises a socket transverse axis that extends from a first longitudinal side to a second longitudinal side of the first adapter socket, the second longitudinal side facing away from the first longitudinal side, wherein the adapter transverse axis slopes relative to the socket transverse axis or extends parallel to the socket transverse axis in an adapter plane defined by the adapter longitudinal axis and by the socket transverse axis.

13. The auxiliary frame according to claim 1, wherein the first adapter socket of the first longitudinal member comprises a socket axis that extends from an upper side to a lower side of the first adapter socket, the lower side facing away from the upper side, wherein the hollow-cylindrical section is accommodated in the first adapter socket, wherein the hollow-cylindrical section comprises a cylinder longitudinal axis that slopes relative to the socket axis or extends parallel to the socket axis in a plane defined by the cylinder longitudinal axis and the socket axis.

14. The auxiliary frame according to claim 1, wherein the first adapter socket of the first longitudinal member comprises a socket axis that extends from an upper side to a lower side of the first adapter socket, the lower side facing away from the upper side, wherein a socket transverse axis extends transversely to the socket axis, wherein the hollow-cylindrical section is accommodated in the first adapter socket, wherein the hollow-cylindrical section comprises a cylinder longitudinal axis that slopes relative to the socket axis or extends parallel to the socket axis in a plane defined by the socket transverse axis and the socket axis.

15. The auxiliary frame according to claim 1, wherein the first longitudinal member or the crossmember is formed from a casting, or wherein the first longitudinal member or the crossmember is formed as a formed tubular part.

16. The auxiliary frame according to claim 1, wherein the first attachment adapter is formed as an extruded attachment adapter or as an attachment adapter comprising a hollow profile.

17. An attachment adapter for fixing a longitudinal member of an auxiliary frame on a vehicle frame of a vehicle, the attachment adapter comprising:
  a hollow-cylindrical section that is configured to be accommodated in an adapter socket of the longitudinal member;
  wherein the attachment adapter is configured as an elongate attachment adapter that extends along an adapter longitudinal axis, wherein the elongate attachment adapter comprises an adapter wall that comprises the hollow-cylindrical section, wherein the adapter wall of the elongate attachment adapter delimits an adapter aperture in the form of an elongate hole, wherein a reinforcing rib is arranged in the elongate hole and is connected to the adapter wall.

18. The attachment adapter according to claim 17, wherein the adapter aperture is shaped to accommodate a mount and is formed in the hollow-cylindrical section of the attachment adapter.

19. The attachment adapter according to claim 17, wherein the attachment adapter comprises an adapter contact surface that is configured to be connected to a locating surface of the adapter socket of the longitudinal member.

20. The attachment adapter according to claim 17, wherein the attachment adapter is configured as a hollow-cylindrical attachment adapter.

21. A method for producing a longitudinal member, comprising:
  selecting an attachment adapter from a plurality of different attachment adapters that are assigned to different vehicle frames comprising different frame geometries, wherein the selected attachment adapter is assigned to a given vehicle frame comprising a given frame geometry;
  supplying a longitudinal member comprising a longitudinal member end that comprises an adapter socket configured to accommodate different attachment adapters configured to fix the longitudinal member on the different vehicle frames comprising the different frame geometries;
  introducing the selected attachment adapter into the adapter socket of the longitudinal member; and
  fixing, in a materially integral manner, the selected attachment adapter in the adapter socket of the longitudinal member.

22. The method according to claim 21, wherein the longitudinal member comprises a connecting element that is configured to connect the longitudinal member to different running gear components or the different vehicle frames, wherein the supplying of the longitudinal member comprises adapting the connecting element for a connection of the longitudinal member to a running gear component or a vehicle frame, and wherein the adaptation of the connecting element comprises introducing holes, milled features, or elongate holes into the connecting element to adapt the connecting element to the running gear component or to the vehicle frame.

* * * * *